United States Patent
Yeh et al.

(10) Patent No.: US 9,483,711 B2
(45) Date of Patent: Nov. 1, 2016

(54) OBJECT DETECTION SYSTEM

(71) Applicant: Altek Autotronics Corporation, Hsinchu (TW)

(72) Inventors: Ching-Sung Yeh, Hsinchu (TW); Ming-Jiun Liaw, Miaoli County (TW); Chi-Fang Hsieh, New Taipei (TW)

(73) Assignee: Altek Autotronics Corporation, Hsinchu (TW)

( * ) Notice: Subject to any disclaimer, the term of this patent is extended or adjusted under 35 U.S.C. 154(b) by 171 days.

(21) Appl. No.: 14/287,063

(22) Filed: May 26, 2014

(65) Prior Publication Data
US 2015/0278633 A1    Oct. 1, 2015

(30) Foreign Application Priority Data
Apr. 1, 2014 (TW) .............................. 103112157 A

(51) Int. Cl.
*G06K 9/00* (2006.01)
*G06K 9/52* (2006.01)
(Continued)

(52) U.S. Cl.
CPC ............. *G06K 9/52* (2013.01); *G06K 9/00711* (2013.01); *G06K 9/00791* (2013.01); *G06K 9/46* (2013.01); *G06K 9/468* (2013.01); *G06T 7/2033* (2013.01); *G06K 9/00805* (2013.01); *G06K 2009/4666* (2013.01); *G06T 2207/30261* (2013.01)

(58) Field of Classification Search
CPC ................. G06K 2009/4666; G06K 9/00711; G06K 9/00791; G06K 9/46; G06K 9/468; G06K 9/52; G06K 9/00805; G06T 7/20
USPC .......................................................... 382/103
See application file for complete search history.

(56) References Cited

U.S. PATENT DOCUMENTS 7,634,111 B2    12/2009    Kondo et al.
7,636,631 B2    12/2009    Shimizu et al.
(Continued)

FOREIGN PATENT DOCUMENTS

CN          1522545         8/2004
TW          200721041       6/2007
(Continued)

OTHER PUBLICATIONS

"Office Action of Taiwan Counterpart Application," issued on Jun. 23, 2015, p. 1-p. 5, in which the listed references were cited.

*Primary Examiner* — Tom Y Lu
(74) *Attorney, Agent, or Firm* — Jianq Chyun IP Office

(57) ABSTRACT

An object detection system including a storage unit, image acquisition module, feature searching module, calculation module, and confirmation module is provided. The image acquisition module obtains a first, second, and third image respectively corresponding to a first, second, and third timepoint of a video sequence from the storage unit, where time difference between the first and second timepoint is less than or equal to that between the second and third timepoint. The feature searching module searches for at least one feature from the first image. When the feature is within a near-distance detected region, the calculation module calculates a motion vector of the feature according to the first and second image; otherwise, it calculates the motion vector of the feature according to the third and one of the first and second image. The confirmation module confirms the existence of a moving object according to the motion vector of the feature.

4 Claims, 4 Drawing Sheets

(51) Int. Cl.
*G06K 9/46* (2006.01)
*G06T 7/20* (2006.01)

(56) References Cited

U.S. PATENT DOCUMENTS

| | | | |
|---|---|---|---|
| 7,720,580 | B2 | 5/2010 | Higgins-Luthman |
| 2003/0210807 | A1* | 11/2003 | Sato ................ G06T 7/2006 382/104 |
| 2004/0021775 | A1* | 2/2004 | Kondo ................ G06T 7/20 348/207.99 |
| 2006/0217886 | A1* | 9/2006 | Fujimoto ................ G06T 7/20 701/300 |
| 2011/0019873 | A1* | 1/2011 | Yamato ............. G06K 9/00805 382/103 |

FOREIGN PATENT DOCUMENTS

| | | |
|---|---|---|
| TW | I295142 | 3/2008 |
| TW | 201116431 | 5/2011 |

* cited by examiner

OBJECT DETECTION SYSTEM

CROSS-REFERENCE TO RELATED APPLICATION

This application claims the priority benefit of Taiwan application serial no. 103112157, filed on Apr. 1, 2014. The entirety of the above-mentioned patent application is hereby incorporated by reference herein and made a part of this specification.

BACKGROUND OF THE INVENTION

1. Field of the Invention

The present invention generally relates to an object detection system, in particular, to a moving object detection system.

2. Description of Related Art

With the continuous growth in vehicle sales, the automobile electronic industry has been drastically developed which covers six major aspects including an automobile safety system, an automobile body system, a driver information system, a suspension & chassis system, an engine transmission system, and a security system, where the automobile safety system holds the highest compound annual growth rate among these aspects.

With an ever-increasing number of vehicles, the probability of road traffic accidents has consequently gone up. A European study shows that 0.5 seconds of early warning time may prevent at least 60% of rear-end collisions, 30% of head-on collisions, and 50% of road-related accidents; 1 second of early warning time may prevent 90% of accidents. Therefore, the vehicle safety system is crucially important.

Due to the cost reduction of image equipment and the development of computer image recognition technology, a vehicle and pedestrian alert technique based on computer images has become a mainstream research topic. Such approach is through the use of a computer vision-based detection system installed in a vehicle. By continuously capturing images during travelling followed by detecting still or moving objects such as streets, sideways, other travelling vehicles, pedestrians by leveraging image processing, computer vision, and pattern recognition techniques, surrounding events may be accurately detected so as to provide the driver more traffic information.

The computer vision-based detection system possesses advantages such as versatility, economic usage, and flexibility. However, the accuracy and the performance of detection may be inconsistent for different image processing algorithms. Consequently, to provide a detection system with high accuracy and high performance is one of the concerned issues to one skilled in the art.

SUMMARY OF THE INVENTION

Accordingly, the present invention is directed to an object detection system which is able to detect a moving object in a video sequence accurately in a real time manner.

The present invention is directed to an object detection system including a storage unit, an image acquisition module, a feature searching module, a calculation module, and a confirmation module. The storage unit is configured to store a video sequence including a plurality of images. The image acquisition module coupled to the storage unit is configured to obtain a first image corresponding to a first timepoint, a second image corresponding to a second timepoint, and a third image corresponding to a third timepoint of the video sequence, where a time difference between the first timepoint and the second timepoint is less than or equal a time difference between the second timepoint and the third timepoint. The feature searching module is configured to search for at least one feature from the first image. The calculation module is configured to determine whether the at least one feature is within a near-distance detected region or a far-distance detected region. When the at least one feature is within the near-distance detected region, the calculation module calculates a motion vector of each of the at least one feature according to the first image and the second image. When the at least one feature is within the far-distance detected region, the calculation module calculates the motion vector of each of the at least one feature according to the third image and one of the first image and the second image. The confirmation module is configured to confirm an existence of a moving object according to the motion vector of each of the at least one feature.

According to an embodiment of the invention, the at least one feature searched by the feature searching module is formed by a 1×1 pixel or a plurality of pixels.

According to an embodiment of the invention, the calculation module calculates the motion vector of each of the at least one feature based on a pixel feature matching algorithm or an optical flow algorithm.

According to an embodiment of the invention, the calculation module calculates a displacement of each of the at least one feature according to the motion vector of each of the at least one feature and accordingly calculates a moving velocity of each of the at least one feature. The confirmation module determines whether the moving velocity of each of the at least one feature is greater than a velocity threshold associated with a proximity of each of the at least one feature. When the confirmation module determines that at least one of the motion vector of the at least one feature is greater than the velocity threshold, the confirmation confirms the existence of the moving object.

The present invention is directed to another object detection system including a storage unit, an image acquisition module, a feature searching module, a calculation module, and a confirmation module. The storage unit is configured to store a video sequence including a plurality of images. The image acquisition module coupled to the storage unit is configured to obtain a first image corresponding to a first timepoint, a second image corresponding to a second timepoint, a third image corresponding to a third timepoint, and a fourth image corresponding to a fourth timepoint of the video sequence, where a time difference between the first timepoint and the second timepoint is less than or equal a time difference between the third timepoint and the fourth timepoint. The feature searching module is configured to search for at least one feature from the first image. The calculation module is configured to determine whether the at least one feature is within a near-distance detected region or a far-distance detected region. When the at least one feature is within the near-distance detected region, the calculation module calculates a motion vector of each of the at least one feature according to the first image and the second image. When the at least one feature is within the far-distance detected region, the calculation module calculates the motion vector of each of the at least one feature according to the third image and the fourth image. The confirmation module is configured to confirm an existence of a moving object according to the motion vector of each of the at least one feature.

According to an embodiment of the invention, the at least one feature searched by the feature searching module is formed by a 1×1 pixel or a plurality of pixels.

According to an embodiment of the invention, the calculation module calculates the motion vector of each of the at least one feature based on a pixel feature matching algorithm or an optical flow algorithm.

According to an embodiment of the invention, the calculation module calculates a displacement of each of the at least one feature according to the motion vector of each of the at least one feature and accordingly calculates a moving velocity of each of the at least one feature. The confirmation module determines whether the moving velocity of each of the at least one feature is greater than a velocity threshold associated with a proximity of each of the at least one feature. When the confirmation module determines that at least one of the motion vector of the at least one feature is greater than the velocity threshold, the confirmation confirms the existence of the moving object.

In summary, the object detection system provided in the present invention calculates a motion vector of each feature by using different image sets in a video sequence. When the feature is within a near-distance detected region, the motion vector of the feature is calculated based on the image set with a smaller time difference so as to reduce the time for object detection. When the feature is within a far-distance detected region, the motion vector of the feature is calculated based on the image set with a greater time difference so as to improve the accuracy for object detection. Moreover, a displacement of the feature is calculated based on its motion vector, and a moving velocity of the feature is calculated accordingly so as to confirm an existence of a moving object. Hence, the object detection system in the present invention may not only track the moving object with accuracy but also achieves real-time performance in processing video streams. This greatly increases the applicability of the present invention in practical application especially for consumer electronic products with low costs.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
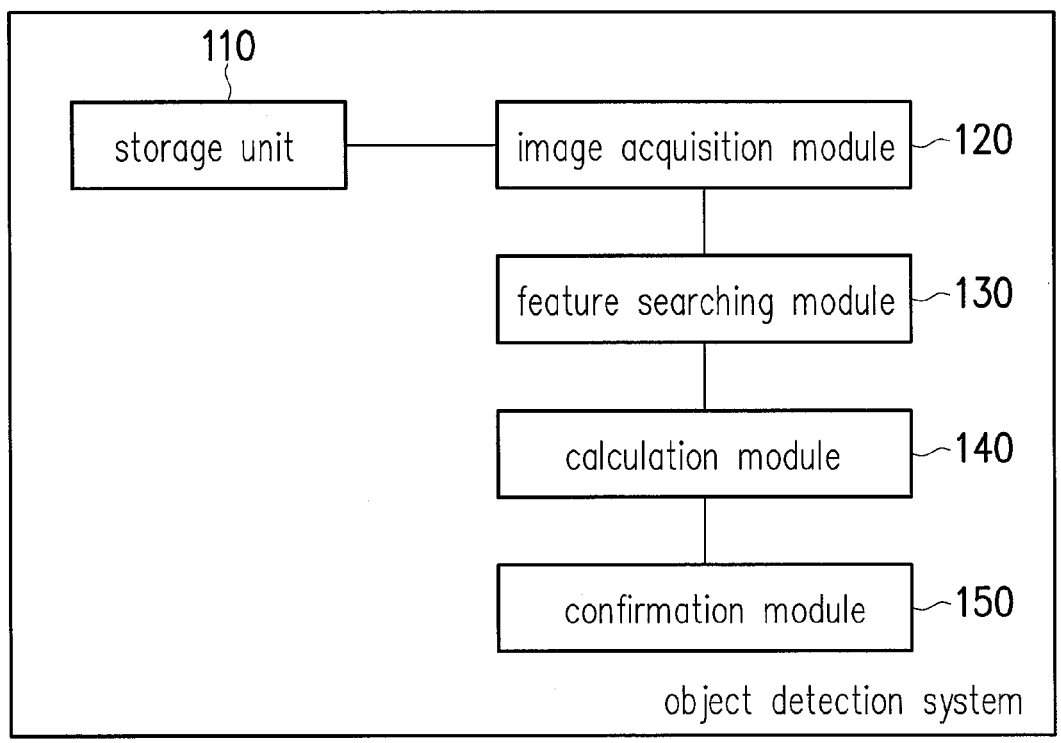
FIG. 1 illustrates a block diagram of an object detection system according to an embodiment of the present invention.

In general, during the detection of a moving object from dynamic images, a same set of two images are used regardless of the proximity of the moving object. In such condition, when the moving object is within a farther detected region, a considerable error may exist between estimated motion information and actual motion information.

For example, Table 1 illustrates velocity estimation errors of two moving objects at a near distance and a far distance by using a same image set:

TABLE 1

| moving object to be estimated | moving object at near distance velocity: (5, 5) cm/ms | moving object at far distance velocity: (5, 5) cm/ms |
| --- | --- | --- |
| time difference between two images | 50 ms | 50 ms |
| actual displacement | (250, 250) cm | (250, 250) cm |
| actual pixel displacement ($\Delta x$, $\Delta y$) | (5, 5) pixels | (2.5, 2.5) pixels |
| estimated pixel displacement ($\Delta x'$, $\Delta y'$) | (4, 4) pixels | (1.5, 1.5) pixels |
| estimated displacement | (200, 200) cm | (150, 150) cm |
| estimated velocity ($V_x'$, $V_y'$) | (4, 4) cm/ms | (3, 3) cm/ms |
| velocity estimation error | (20%, 20%) | (40%, 40%) |

An actual pixel displacement of each pixel in different images corresponds to different actual displacement in an actual space domain. In this example, given that the actual displacement corresponding to one actual pixel displacement is 50 cm at a near distance, and the actual displacement corresponding to one actual pixel displacement is 100 cm at a far distance. Assume that there exists a one-pixel matching error in the estimated pixel displacement. The estimated error would be 20% for the moving object with a velocity of (5, 5) cm/ms at a near distance, and the estimated error would be 40% for the moving object also with a velocity of (5, 5) cm/ms at a far distance. Hence, if a same image set is used for velocity estimation of the moving objects, the moving object at a far distance may produce a higher velocity estimation error. Accordingly, the main idea of the present invention is to determine the proximity of the moving object and obtain the moving information of the moving object from different image sets adaptively.

Reference will now be made in detail to the present embodiments of the invention, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the present invention.

FIG. 1 is a block diagram of an object detection system according to an embodiment of the present invention. It should, however, be noted that this is merely an illustrative example and the present invention is not limited in this regard. All components of the electronic apparatus and their configurations are first introduced in FIG. 1. The detailed functionalities of the components are disclosed along with FIG. 2.

Referring to FIG. 1, an object detection system 100 includes a storage unit 110, an image acquisition module 120, a feature searching module 130, a calculation module 140, and a confirmation module 150. The object detection system 100 may be externally connected to or built-in in an electronic device provided with an image capturing feature such as a personal computer, a laptop computer, a digital camera, a digital camcorder, a web camera, a smart phone, a tabular computer, an event data recorder, a vehicle audio and video system, and so forth. The present invention is not limited herein.

The storage unit 110 may be one or a combination of a stationary or mobile random access memory (RAM), read-only memory (ROM), flash memory, hard disk, or any other similar devices. The storage unit 110 is configured to store image data.

The image acquisition module 120, the feature searching module 130, the calculation module 140, and the confirmation module 150 may be implemented by software programs, hardware circuits, or combinations thereof. The software may be source codes, applications, drivers, software modules or functions particularly implemented for certain features. The hardware may be a central processing unit (CPU), a programmable controller, a digital signal processor (DSP), or a programmable general- or specific-purpose microprocessor. For example, the image acquisition module 120, the feature searching module 130, the calculation module 140, and the confirmation module 150 may be computer programs or instructions assessable by the processor of the object detection system 100 to perform object detection.

Figure 2:
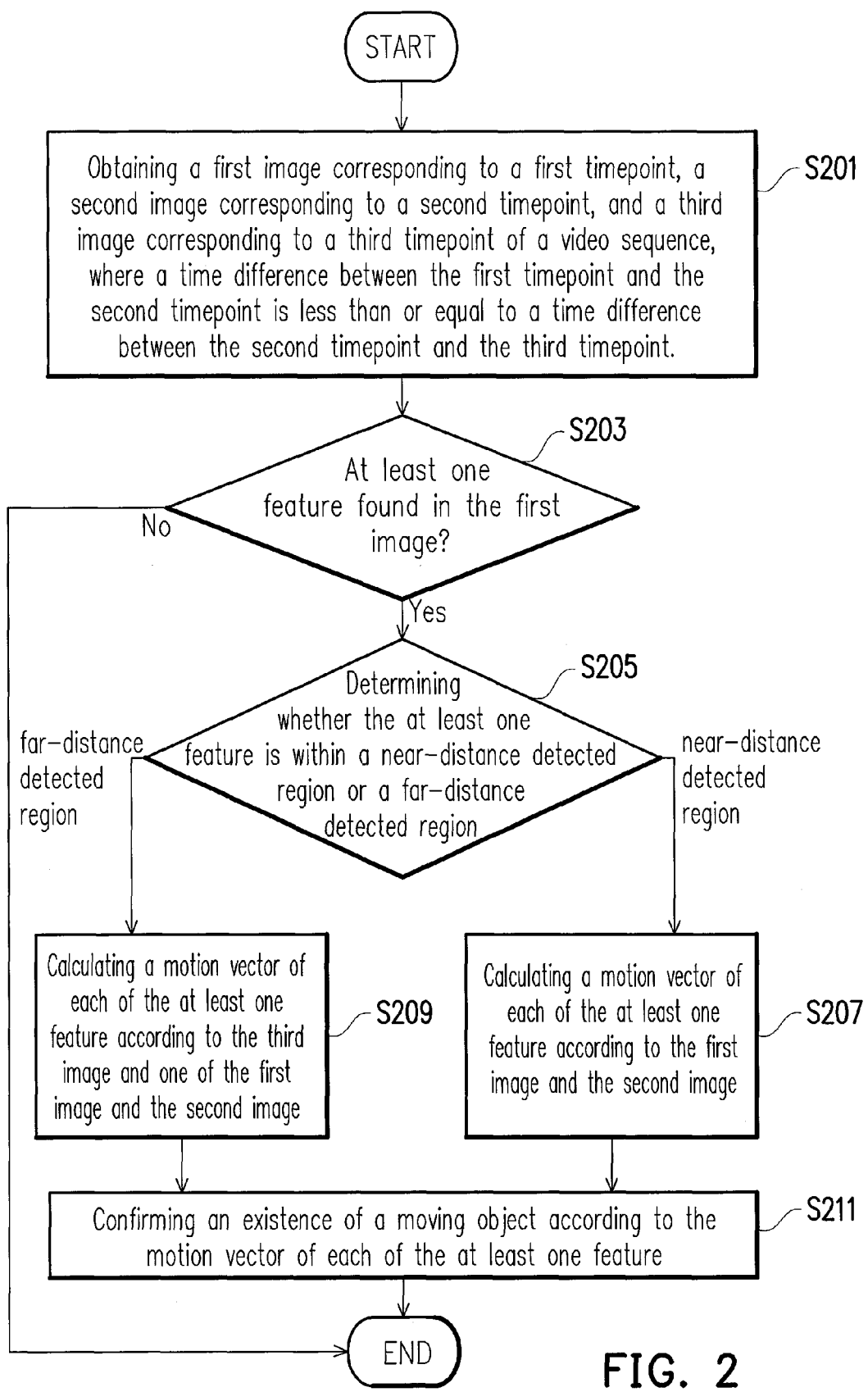
FIG. 2 illustrates a flowchart of an object detection method according to the first embodiment of the present invention.

FIG. 2 illustrates a flowchart of an object detection method according to the first embodiment of the present invention. Referring to FIG. 2, the method provided in the present embodiment is adapted to the object detection system 100 in FIG. 1. The detailed steps of the object detection method will be illustrated along with the components of the object detection system 100 hereinafter. In the present embodiment, the object detection system 100 is coupled to an event data recorder for illustration. Thus, a video sequence including a plurality of images captured by the event data recorder is prestored in the storage unit 110 of the object detection system 100 before the object detection system 100 performs the object detection method, where the content of the video sequence is a road view captured by the event data recorder.

Referring to both FIG. 1 and FIG. 2, in Step S201, the image acquisition module 120 obtains a first image corresponding to a first timepoint, a second image corresponding to a second timepoint, and a third image corresponding to a third timepoint of the video sequence. Assume that the first timepoint $t_1$ is prior to the second timepoint $t_2$ and the second timepoint $t_2$ is prior to the third timepoint $t_3$, then a time difference between the first timepoint and the second time point is less than that between the first timepoint and the third timepoint. In other words, the first timepoint $t_1$, the second timepoint $t_2$, and the third timepoint $t_3$ may satisfy the following Ineq.(1):

$$|t_1-t_2| \leq |t_1-t_3| \qquad \text{Ineq.(1)}$$

Next, in Step S203, the feature searching module 130 searches for at least one feature from the first image. To be specific, the feature searching module 130 may search for at least one feature from the first image by leveraging a conventional feature detection algorithm so as to recognize the shape and the structure of any object from the first image, where the at least one feature searched by the feature searching module 130 is formed by a 1×1 pixel or a plurality of pixels. In the present embodiment, the feature searching module 130 may search for an object feature such as a vehicle or pedestrian, and the aforementioned at least one feature may be an edge contour, a corner, or a blob formed by the vehicle or the pedestrian. The present invention is not limited herein.

In the present embodiment, the feature searching module 130 may search for the at least one feature from the first image by using a histogram of oriented gradient (HOG). The feature searching module 130 may first divide the first image into a plurality of cells and identify the at least one feature based on the gradient value and the gradient direction of each pixel within the cells. Such approach may maintain a high advantage of recognizing objects with sharp edges as well as ignoring any local distortion or small obstacle from the images, and thus is suitable for applications such as pedestrian detection.

In another embodiment, the feature detection algorithm may be an edge detection algorithm, where the boundaries of an object and background are searched from the first image through the variation of the grayscales. The feature detection algorithm may be a corner detection algorithm, where the corners of an object are searched from the first image through a point of local intensity maximum or minimum, line endings, or a point on a curve such that the curvature is locally maximal. The feature searching module 130 may determine whether the contours formed by the boundaries or the corners correspond to the feature of, for example, a vehicle or pedestrian. In another embodiment, the feature searching module 130 may detect any blob that is different from its surroundings in terms of color and grayscales by leveraging a blob detection algorithm and identify if the detected blobs correspond to the feature of the feature of vehicles or pedestrians. The feature detection algorithm in the present invention is not limited herein.

When the feature searching module 130 is not able to find out any feature from the first image, the object detection system 100 may end the object detection process corresponding to the first image. On the other hand, when the feature searching module 130 finds out the at least one feature from the first image, the calculation module 140 may determine whether the at least one feature is within a near-distance detected region or a far-distance detected region in Step S205. The near-distance detected region herein is the region with a closer distance with respect to the position where the first image is captured (i.e. the event data recorder), and the far-distance detected region is the region with a farther distance with respect to the position where the first image is captured.

Figure 3A:
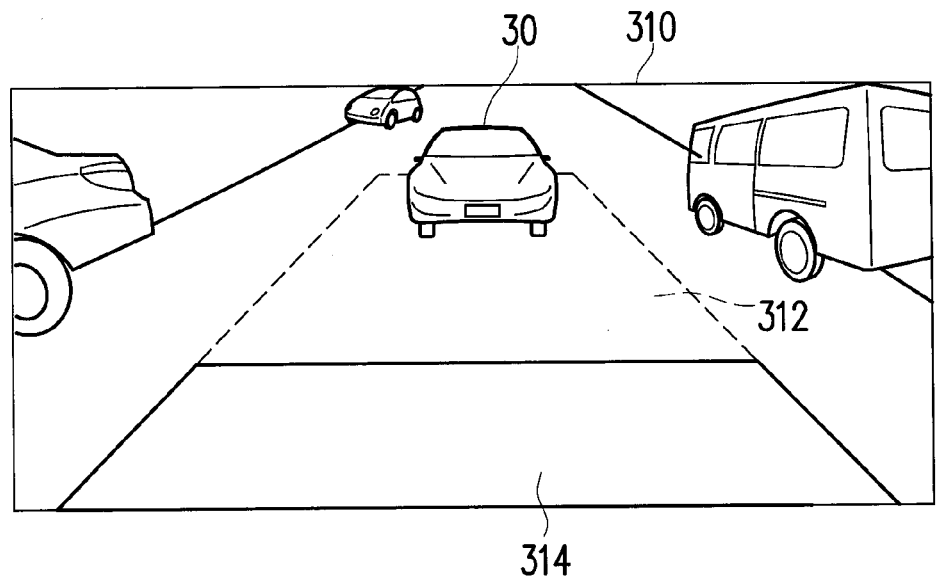
FIG. 3A illustrates a first image according to an embodiment of the present invention.

For example, FIG. 3A illustrates a first image according to an embodiment of the present invention.

Referring to FIG. 3A, after the object detections system 100 obtains a first image 310 from the storage unit 110, the feature searching module 130 may search for at least one feature from the first image 310. In the present embodiment, an object 30 is formed by the at least one feature, where the object 30 may be an approaching vehicle from an opposite direction. The calculation module 140 may then determine if the at least one feature forming the object 30 is within a far-distance detected region 314 or a near-distance detected region 312. The at least one feature is within the far-distance detected region in the first image 310 illustrated in FIG. 3A.

When the calculation module 140 determines that the at least one feature is within the near-distance detected region, it calculates a motion vector of each of the at least one feature according to the first image and the second image in Step S207. When the calculation module 140 determines that the at least one feature is within the far-distance detected region, it calculates the motion vector of each of the at least one feature according to the third image and one of the first image and the second image in Step S209. To be specific, when the at least one feature is within the near-distance detected region, the contours or the blobs formed by the at least one feature may occupy a larger area in each of the images. Given the same time and moving velocity constraints, the displacement of each of the feature is more notable. Thus, the calculation module 140 may calculate the motion vector of each of the feature based on the first image and the second image with a less time difference to reduce the time for feature searching and facilitate real-time processing. On the other hand, when the at least one features is within the far-distance detected area, the contours or the blobs formed by the at least one feature may occupy a smaller area in each of the images. Given the same time and moving velocity constraints, the displacement of each of the feature is not notable. Thus, the calculation module 140 may calculate the motion vector of each of the feature based on the first image and the third image with a larger time difference so as to calculate the motion vector of each of the at least one feature at the far distance with precision.

In another embodiment, the first timepoint $t_1$, the second timepoint $t_2$, and the third timepoint $t_3$ satisfy the aforementioned Ineq.(1) and the following Ineq.(1.5):

$$|t_1-t_2| \leq |t_2-t_3| \qquad \text{Ineq.(1.5)}$$

When the calculation module 140 determines that the at least one feature is within the near-distance detected region, it calculates the motion vector of the at least one feature according to the first image and the second image. When the calculation module 140 determines that the at least one feature is within the far-distance detected region, it calculates the motion vector of the at least one feature according to the first image and the third image, or alternatively, the second image and the third image with a larger time difference.

Figure 3B:
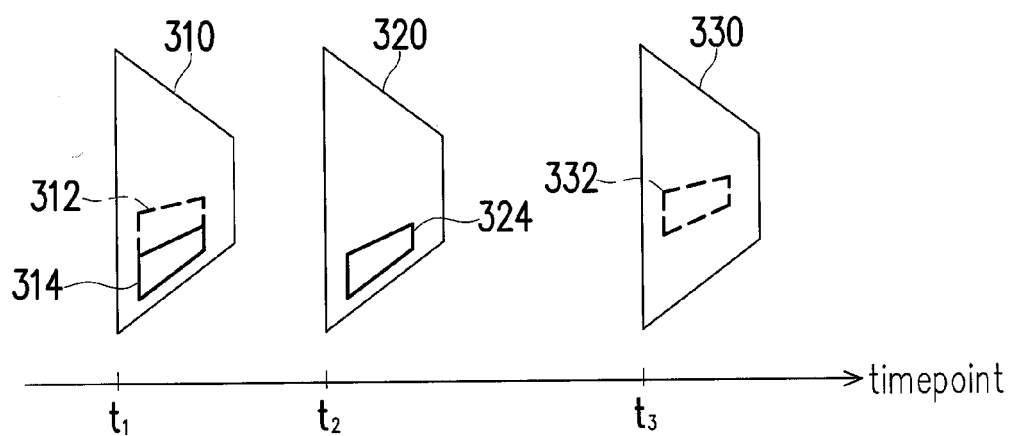
FIG. 3B illustrates a schematic diagram of Step S209 of the object detection method according to an embodiment of the present invention.

FIG. 3B illustrates a schematic diagram of Step S209 of the object detection method according to an embodiment of the present invention.

Referring to FIG. 3B, assume that the image acquisition module 120 obtains a first image 310 corresponding to a first timepoint $t_1$, a second image 320 corresponding to a second timepoint $t_2$, and a third image 330 corresponding to a third timepoint $t_3$ of a video sequence from the storage unit 110. According to FIG. 3A, the first image 310 includes the near-distance detected region 314 and the far-distance detected region 312. When the calculation module 140 determines that at least one feature is within the near-distance detected region 314, it may calculate the motion vector of each of the at least one feature according to the near-distance detected region 314 in the first image 310 and a near-distance detected region 324 in the second image 320.

On the other hand, when the calculation module 140 determines that the at least one feature is within the far-distance detected region 312, the calculation module 140 may calculate the motion vector of each of the at least one feature according to the far-distance detected region 312 in the first image 310 and a far-distance detected region 332 in the third image 330 in the present embodiment. In another embodiment, the calculation module 140 may calculate the motion vector of each of the at least one feature according to a far-distance detected region (not shown) in the second image 320 and the far-distance detected region 332 in the third image 330.

Table 2 illustrates velocity estimation errors of two moving objects at a near distance and a far distance by using two different image sets:

TABLE 2

| moving object to be estimated | moving object at near distance velocity: (5, 5) cm/ms | moving object at far distance velocity: (5, 5) cm/ms |
|---|---|---|
| image set | the first image and the third image | the first image and the third image |
| time difference between two images | 50 ms | 50 ms |
| actual displacement | (250, 250) cm | (250, 250) cm |
| actual pixel displacement ($\Delta x, \Delta y$) | (5, 5) pixels | (2.5, 2.5) pixels |
| estimated pixel displacement ($\Delta x', \Delta y'$) | (4, 4) pixels | (1.5, 1.5) pixels |
| estimated displacement | (200, 200) cm | (150, 150) cm |
| estimated velocity ($V x', V y'$) | (4, 4) cm/ms | (4, 4) cm/ms |
| velocity estimation error | (20%, 20%) | (20%, 20%) |

An actual pixel displacement of each pixel in different images corresponds to different actual displacement in an actual space domain. In this example, given that the actual displacement corresponding to one actual pixel displacement is 50 cm at a near distance, and the actual displacement corresponding to one actual pixel displacement is 100 cm at a far distance. Assume that there exists a one-pixel matching error in the estimated pixel displacement. When the at least one feature is within the far-distance detected region, the velocity estimation error of the moving object with a velocity of (5 cm/ms, 5 cm/ms) at a far distance based on the first image and the third image (i.e. 20%) may create a two times improvement over the velocity estimated error listed in Table 1 (i.e. 40%).

Additionally, the calculation module 140 may calculate the motion vector of each of the at least one feature based on a pixel-matching algorithm or an optical flow algorithm To be specific, when the feature searching module 130 finds out the at least one feature from the near-distance detected region in the first image, the calculation module 140 may search for at least one feature from the second image 320 similar to that of the first image 310 by using the pixel-matching algorithm. In the present embodiment, the calculation module 140 may search for the at least one feature from the second image 320 starting from the position corresponding to the center of the at least one feature in the first image 310 to its neighboring pixels according to the characteristic such as color of the at least one feature in the first image 310. Next, the calculation module 140 may calculate the motion vector of each of the feature within a continuous time according to the position of the at least one feature in each of the first image 310 and the second image 320.

In another embodiment, given that the feature searching module 130 finds out the at least one feature from the near-distance detected region in the first image. According to the optical flow algorithm, the calculation module 140 may search for the corresponding feature from the second image and calculate the motion vector based on the invariance of the pixel value of each of the at least one feature in different images.

Next, in Step S211, the confirmation module 150 confirms an existence of a moving object according to the motion vector of each of the at least one feature. To be specific, after the calculation module 140 obtains the motion vector of each of the at least one feature, it may calculate a displacement of each of the at least one feature based on a moving velocity, a frame rate, and a motion vector during image capture, and accordingly calculate a moving velocity of each of the at least one feature. The confirmation module 150 may determine whether at least one of the moving velocity of the at least one feature is greater than a velocity threshold. The velocity threshold is associated with the moving velocity during image capture. In other words, the confirmation module 150 may determine whether the difference between the moving velocity of the at least one feature and the moving velocity during image capture is greater than the velocity threshold. In an embodiment, the velocity threshold corresponding to the at least one feature within the near-distance detected region may be different from that corresponding to the at least one feature within the far-distance detected region for a more accurate determination.

When the confirmation module 150 determines that the moving velocity of the at least one feature is greater than the velocity threshold, it means that the at least one feature represents the moving object such as another travelling vehicle or pedestrian, and thus the confirmation module 150 may confirm the existence of the moving object. When the confirmation module 150 determines that the moving velocity of the at least one feature is not greater than the velocity threshold, it means that the at least one feature represents the still object such as a street, a building, or a vehicle parking along a street, and thus the confirmation module 150 may confirm that no moving object exists.

In an embodiment, the object detection system 100 further includes an alerting module (not shown). When the confirmation module 150 confirms the existence of the moving object, the alerting module may provide one or a combination of a hint message display, a sound buzzer, and light so as to alert the driver of the existence of the moving object.

Figure 4:
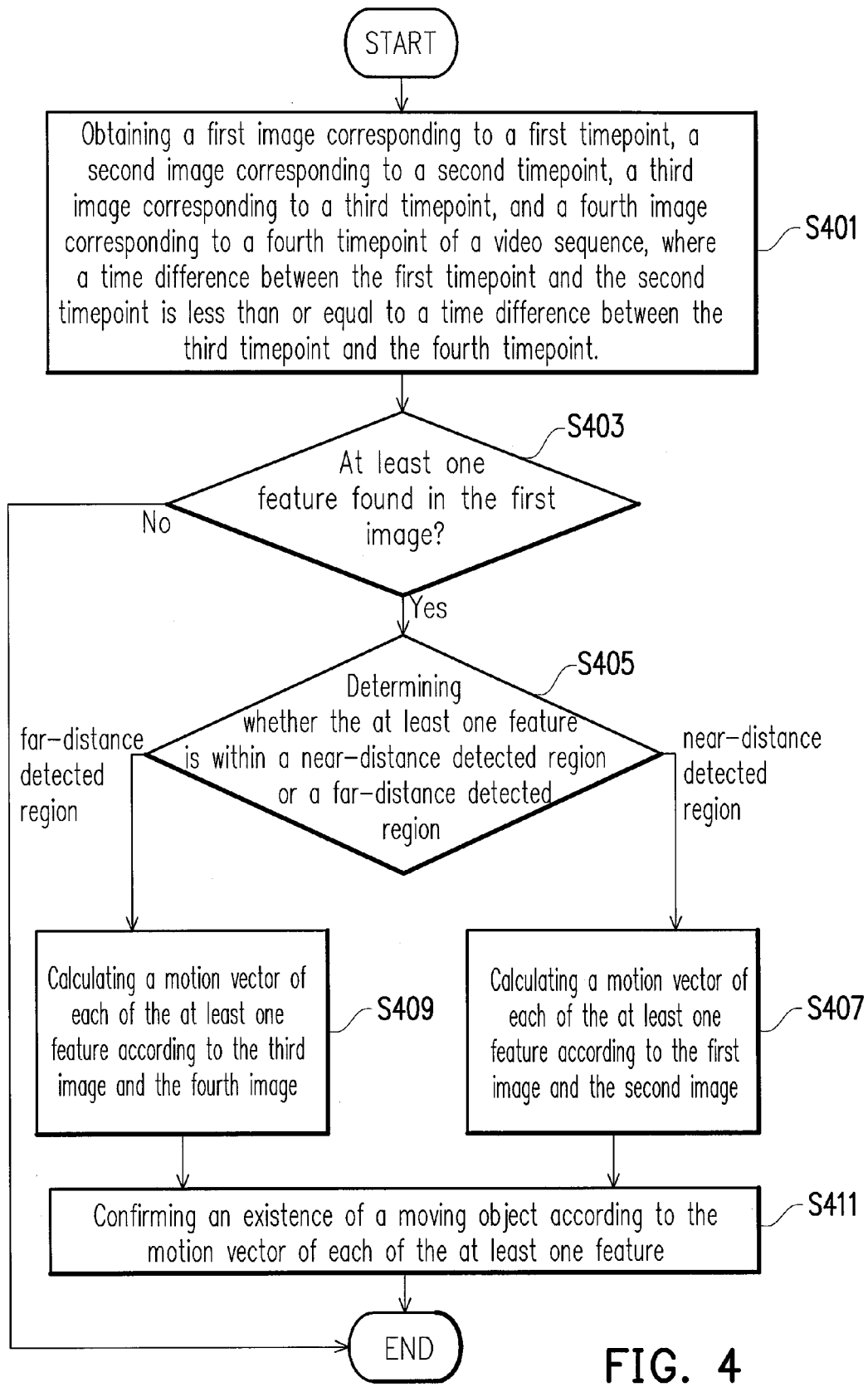
FIG. 4 illustrates a flowchart of an object detection method according to the second embodiment of the present invention.

FIG. 4 illustrates a flowchart of an object detection method according to the second embodiment of the present invention. Referring to FIG. 4, the method provided in the present invention is also adapted to the object detection system 100 in FIG. 1. In the present embodiment, the object detection system 100 is coupled to an event data recorder as well. Therefore, before the object detection method is executed, a videos sequence including a plurality of images extracted from the event data recorder is prestored the storage unit 110 of the object detection system 100, where the content of the video sequence is a road view captured by the event data recorder.

Referring to both FIG. 1 and FIG. 4, in Step S401, the image acquisition module 120 obtains a first image corresponding to a first timepoint, a second image corresponding to a second timepoint, a third image corresponding to a third timepoint, and a fourth image corresponding to a fourth timepoint of the video sequence. Assume that the first timepoint $t_1$ is prior to the second timepoint $t_2$, the second timepoint $t_2$ is prior to the second timepoint $t_3$, and the third timepoint $t_3$ is prior to the fourth timepoint $t_4$. Then a time difference between the first timepoint and the second time point is less than that between the third timepoint and the fourth timepoint. In other words, the first timepoint $t_1$, the second timepoint $t_2$, the third timepoint $t_3$, and the fourth timepoint $t_4$ may satisfy the following Ineq.(2):

$$|t_1-t_2| \le |t_3-t_4| \qquad \text{Ineq.(2)}$$

Next, the feature searching module 130 may search for at least one feature from the first image in Step S403. When the feature searching module 130 is not able to find out any feature from the first image, the object detection system 100 may end the object detection process corresponding to the first image. When the feature searching module 130 find out the at least one feature from the first image, the calculation module 140 determines whether the at least one feature is within a near-distance detected region or a near-distance detected region in Step S405. When the calculation module 140 determines that the at least one feature is within the near-distance detected region, it calculates a motion vector of each of the at least one feature according to the first image and the second image in Step S407. When the calculation module 140 determines that the at least one feature is within the far-distance detected region, it calculates the motion vector of each of the at least one feature according to the third image and the fourth image in Step S409. Next, the confirmation module 150 confirms an existence of a moving object according to the motion vector of the at least one feature in step S411.

The difference between the embodiment in FIG. 4 and the embodiment in FIG. 2 is the number of images used for calculating the motion vector, and yet the two adopted concepts are similar. When the at least one feature is within the near-distance detected region, the calculation module 140 may calculate the motion vector of each of the at least one feature according to two images with a smaller time difference. When the at least one feature is within the far-distance detected region, the calculation module 140 may calculate the motion vector of the at least one feature according to two images with a greater time difference. The details of Step S403-S411 may be inferred by one skilled in the art with reference to the related descriptions of FIG. 1 to FIG. 3B, which may not be repeated hereinafter.

In summary, the object detection system provided in the present invention calculates a motion vector of each feature by using different image sets in a video sequence. When the feature is within a near-distance detected region, the motion vector of the feature is calculated based on the image set with a smaller time difference so as to reduce the time for object detection. When the feature is within a far-distance detected region, the motion vector of the feature is calculated based on the image set with a greater time difference so as to improve the accuracy for object detection. Moreover, a displacement of the feature is calculated based on its motion vector, and a moving velocity of the feature is calculated accordingly so as to confirm an existence of a moving object. Hence, the object detection system in the present invention may not only track the moving object with accuracy but also achieves real-time performance in processing video streams. This greatly increases the applicability of the present invention in practical application especially for consumer electronic products with low costs.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An object detection system comprising:
   a memory, configured for storing at least a video sequence comprising a plurality of images;
   a processor, coupled to the memory, configured for:
   obtaining a first image corresponding to a first timepoint, a second image corresponding to a second timepoint, and a third image corresponding to a third timepoint of a video sequence from the storage unit, wherein a time difference between the first timepoint and the second timepoint is less than or equal to a time difference between the second timepoint and the third timepoint;
   searching for at least one feature from the first image;

determining whether the at least one feature is within a near-distance detected region or a far-distance detected region;

when the at least one feature is within the near-distance detected region, calculating a motion vector of each of the at least one feature according to the first image and the second image;

when the at least one feature is within the far-distance detected region, calculating the motion vector of each of the at least one feature according to the third image and one of the first image and the second image; and confirming an existence of a moving object according to the motion vector of each of the at least one feature.

2. The object detection system according to claim 1, wherein the at least one feature searched by the feature searching module is formed by a 1×1 pixel or a plurality of pixels.

3. The object detection system according to claim 1, wherein the processor calculates the motion vector of each of the at least one feature based on a pixel feature matching algorithm or an optical flow algorithm.

4. The object detection system according to claim 1, wherein the processor calculates a displacement of each of the at least one feature according to the motion vector of each of the at least one feature, accordingly calculates a moving velocity of each of the at least one feature, and determines whether the moving velocity of each of the at least one feature is greater than a velocity threshold associated with a proximity of each of the at least one feature, wherein when at least one of the motion vector of the at least one feature is determined greater than the velocity threshold, the processor confirms the existence of the moving object.

* * * * *